(12) United States Patent
Xu

(10) Patent No.: US 12,232,485 B2
(45) Date of Patent: Feb. 25, 2025

(54) PROTECTIVE COLLAR FOR PET

(71) Applicant: Liang Xu, Suzhou (CN)

(72) Inventor: Liang Xu, Suzhou (CN)

( * ) Notice: Subject to any disclaimer, the term of this patent is extended or adjusted under 35 U.S.C. 154(b) by 0 days.

(21) Appl. No.: 18/743,152

(22) Filed: Jun. 14, 2024

(65) Prior Publication Data
US 2024/0324556 A1 Oct. 3, 2024

(51) Int. Cl.
*A01K 13/00* (2006.01)

(52) U.S. Cl.
CPC .................. *A01K 13/006* (2013.01)

(58) Field of Classification Search
CPC ..... A01K 13/006; A01K 27/001; A01K 13/00
USPC .......................................................... 119/850
See application file for complete search history.

(56) References Cited

U.S. PATENT DOCUMENTS

| | | | | |
|---|---|---|---|---|
| 5,349,927 | A * | 9/1994 | Campbell | A01K 13/006 119/815 |
| 6,925,966 | B1 * | 8/2005 | Wexler | A61D 9/00 119/815 |
| 8,181,609 | B2 * | 5/2012 | Ohashi | A01K 13/006 119/815 |
| 9,585,365 | B1 * | 3/2017 | Gibson | A01K 27/001 |
| 10,555,501 | B2 * | 2/2020 | Hansen | A01K 13/006 |
| D906,603 | S * | 12/2020 | Vaccaro | D30/152 |
| 11,350,606 | B2 * | 6/2022 | Zablow | A01K 27/002 |
| D957,068 | S * | 7/2022 | Li | D30/152 |
| D989,414 | S * | 6/2023 | Li | D30/152 |
| D1,013,292 | S * | 1/2024 | Yang | D30/152 |
| 2009/0056642 | A1 | 3/2009 | Markfield | |
| 2010/0024745 | A1 * | 2/2010 | Harlow | A01K 13/006 119/856 |
| 2010/0192871 | A1 | 8/2010 | Winestock | |
| 2012/0037093 | A1 | 2/2012 | Markfield | |
| 2012/0145093 | A1 * | 6/2012 | Martinez | A01K 13/006 119/863 |
| 2017/0280681 | A1 * | 10/2017 | Jurgens | A01K 15/04 |
| 2020/0315762 | A1 * | 10/2020 | Correa | A61D 9/00 |

* cited by examiner

*Primary Examiner* — Yvonne R Abbott-Lewis
(74) *Attorney, Agent, or Firm* — JEEN IP LAW, LLC

(57) ABSTRACT

The present disclosure discloses a protective collar for a pet, including: a basically fan-shaped sheet material body, wherein the sheet material body includes a front part, a rear part, a first side end, and a second side end; the front part extends from the first side end to the second side end, and the rear part extends from the first side end to the second side end; a radius of the front part is greater than a radius of the rear part; and a closing mechanism, wherein the closing mechanism attaches the first side end to the second side end, so that the sheet material body is enclosed to form a basically conical protective collar; the front part is semi-transparent or transparent.

19 Claims, 6 Drawing Sheets

PROTECTIVE COLLAR FOR PET

TECHNICAL FIELD

The present disclosure relates to the field of pet supplies, and in particular, to a protective collar for a pet.

BACKGROUND

When pets (such as dogs and cats) are injured or have diseased parts, the pets would instinctively lick the wounds or the diseased parts. If the pets repeatedly lick the wounds, it is difficult for the wounds or the diseased parts to heal, and the risk of pet infection would increase. Therefore, to protect the pets, protective collars, also referred to as Elizabethan collar, have emerged. The protective collars are worn at the necks of the pets. In the prior art, after wearing a protective collar, a pet can be prevented from licking its wound or diseased part, but the protective collar may restrict the movement of the pet to an extent. For example, wearing the protective collar may block the field of view of the pet, making it inconvenient for the pet to observe a surrounding environment. Furthermore, if the pet needs to eat food or drink water, the protective collar needs to be unfastened and taken down from the body of the pet. After the pet has finished eating or drinking, the protective collar is worn on the pet again.

Therefore, the existing protective collar is inconvenient to use.

SUMMARY

To overcome the shortcomings in the prior art, the present disclosure provides a protective collar for a pet.

The technical solution used in the present disclosure to solve the technical problems is as follows:

The present disclosure provides a protective collar for a pet, including:
 a basically fan-shaped sheet material body, wherein the sheet material body includes a front part, a rear part, a first side end, and a second side end; the front part extends from the first side end to the second side end, and the rear part extends from the first side end to the second side end; a radius of the front part is greater than a radius of the rear part; and
 a closing mechanism, wherein the closing mechanism attaches the first side end to the second side end, so that the sheet material body is enclosed to form a basically conical protective collar; the front part is semi-transparent or transparent; and when the protective collar is worn at the neck of a pet, the front part surrounds the head of the pet for allowing the pet to observe a surrounding environment.

The protective collar further includes a first flexible connector; the front part at least includes a first transparent panel and a second transparent panel which are adjacent to each other; the first transparent panel extends from a front side edge of the front part to a rear side edge of the front part; the second transparent panel extends from the front side edge of the front part to the rear side edge of the front part; one side of the first flexible connector is sewn to the first transparent panel; and the other side of the first flexible connector is connected to the second transparent panel.

The first flexible connector extends from the front side edge of the front part to the rear side edge of the front part.

The protective collar further includes a second flexible connector; one side of the second flexible connector is sewn to the rear side edge of the front part; and the other side of the second flexible connector is sewn to a front side edge of the rear part.

The second flexible connector extends from the first side end to the second side end.

The rear part is provided with a folding edge; the folding edge extends from the front side edge of the rear part to a rear side edge of the rear part; and the folding edge is arranged in a straight direction of the first flexible connector.

The closing mechanism includes a first closing member and a second closing member; the first closing member is arranged at the first side end; the second closing member is arranged at the second side end; and the first closing member is detachably connected to the second closing member.

The present disclosure further provides a protective collar for a pet, including:
 a basically fan-shaped sheet material body, wherein the sheet material body includes a front part, a rear part, a first side end, and a second side end; the front part extends from the first side end to the second side end, and the rear part extends from the first side end to the second side end; a radius of the front part is greater than a radius of the rear part; and
 a closing mechanism, wherein the closing mechanism attaches the first side end to the second side end, so that the sheet material body is enclosed to form a basically conical protective collar; the front part is semi-transparent or transparent; when the protective collar is worn at the neck of a pet through the rear part, the front part surrounds the head of the pet for allowing the pet to observe a surrounding environment; and
 the front part can be folded towards an outer side of the protective collar relative to the rear part to allow the head of the pet to get out.

The protective collar further includes a first flexible connector; the front part at least includes a first transparent panel and a second transparent panel which are adjacent to each other; the first transparent panel extends from a front side edge of the front part to a rear side edge of the front part; the second transparent panel extends from the front side edge of the front part to the rear side edge of the front part; one side of the first flexible connector is sewn to the first transparent panel; and the other side of the first flexible connector is connected to the second transparent panel.

The first flexible connector extends from the front side edge of the front part to the rear side edge of the front part.

The first transparent panel and the second transparent panel are both transparent plastic panels.

The protective collar for the pet further includes a second flexible connector; one side of the second flexible connector is sewn to the rear side edge of the front part; and the other side of the second flexible connector is sewn to a front side edge of the rear part, so that the front part can be folded towards the outer side of the protective collar relative to the rear part.

The second flexible connector extends from the first side end to the second side end.

The rear part is flexible and air-permeable.

The rear part includes a first mesh layer and a second mesh layer which are stacked; and a flexible layer is arranged between the first mesh layer and the second mesh layer, so that the rear part is flexible and air-permeable.

The rear part is provided with a sewing thread; the sewing thread extends from the front side edge of the rear part to the rear side edge of the rear part; and the sewing thread is used to sew the first mesh layer, the flexible layer, and the second mesh layer in sequence, so that the sewing thread is formed into a folding edge of the rear part.

The rear part is non-transparent.

The rear side edge of the rear part is provided with an adjustment channel extending along the rear side edge of the rear part; an adjustment rope is arranged in the adjustment channel; two ends of the adjustment rope are respectively threaded out of two ends of the adjustment channel; and rope locks are respectively arranged at the two ends of the adjustment rope.

The closing mechanism includes a first closing member and a second closing member; the first closing member is arranged at the first side end; the second closing member is arranged at the second side end; and the first closing member is detachably connected to the second closing member.

The first closing member and the second closing member are mutually coupled buttons.

The present disclosure has the beneficial effects: During use of the protective collar, the first side end is attached to the second side end through the closing mechanism, so that the sheet material body can be enclosed to form the basically conical protective collar, so that the protective collar can be worn at the neck of the pet. Furthermore, the front part of the protective collar surrounds the head of the pet, so that the pet can be prevented from licking a wound or a diseased part. Meanwhile, since the front part is semi-transparent or transparent, the pet can observe a surrounding environment through the transparent front part, so that the pet can have a wider field of view.

Further, in the protective collar, the front part can be folded towards the outer side of the protective collar relative to the rear part. If the pet needs to eat food or drink water, the front part can be folded towards the outer side, so that the head of the pet can get out of the protective collar, and the pet can eat food or drink water. After the pet finishes eating or drinking, only the front part needs to be reset to surround the head of the pet, so that the protective collar can be conveniently switched in different states, and the protective collar is very convenient to use.

BRIEF DESCRIPTION OF THE DRAWINGS

For clearer descriptions of the technical solutions according to the embodiments of the present disclosure, the drawings required to be used in the description of the embodiments are briefly introduced below. The drawings in the description below are only some embodiments of the present disclosure, and those skilled in the art that other drawings can be acquired according to the drawings without creative efforts.

The present disclosure will be further explained below in conjunction with the accompanying drawings and embodiments.

DETAILED DESCRIPTION OF THE EMBODIMENTS

Figure 1:
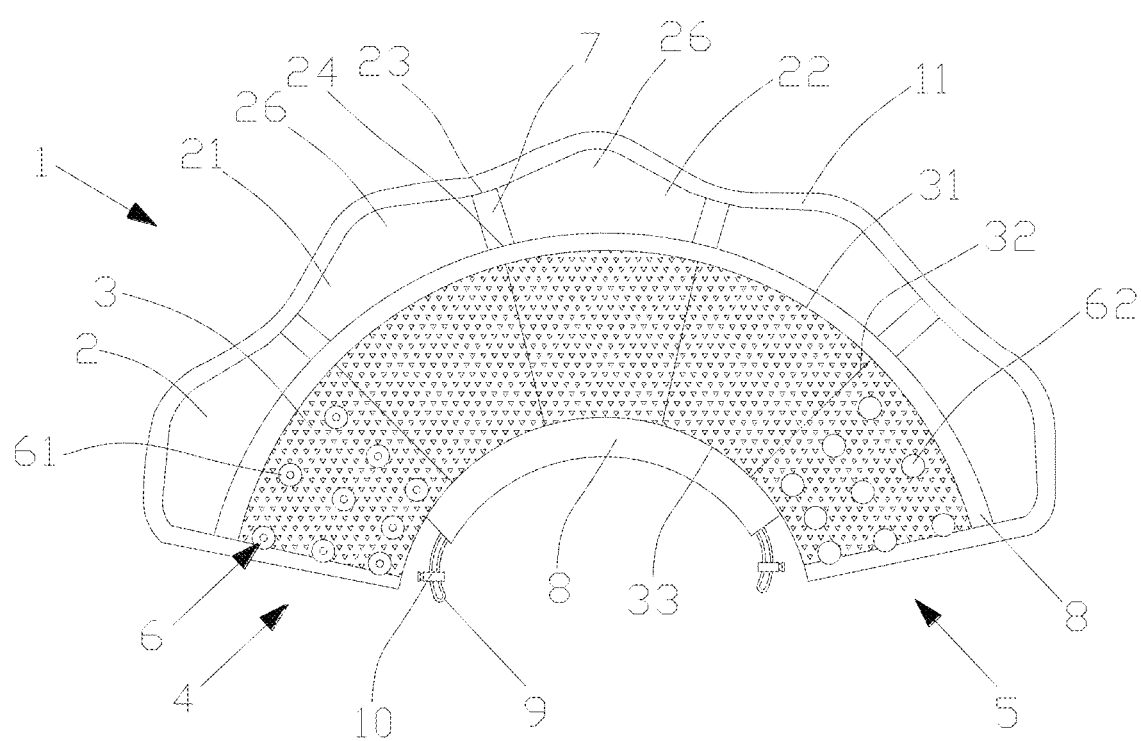
FIG. 1 is a schematic structural diagram of unfolding a protective collar into a sheet material body.

Referring to FIG. 1 to FIG. 6, a protective collar for a pet is provided, including:

a basically fan-shaped sheet material body 1, wherein the sheet material body includes a front part 2, a rear part 3, a first side end 4, and a second side end 5; the front part 2 extends from the first side end 4 to the second side end 5, and the rear part 3 extends from the first side end 4 to the second side end 5; a radius of the front part 2 is greater than a radius of the rear part 3; and a closing mechanism 6, wherein the closing mechanism 6 attaches the first side end 4 to the second side end 5, so that the sheet material body 1 is enclosed to form a basically conical protective collar; the front part 2 is semi-transparent or transparent; when the protective collar is worn at the neck of a pet through the rear part 3, the front part 2 surrounds the head of the pet for allowing the pet to observe a surrounding environment; and the front part 2 can be folded towards an outer side of the protective collar relative to the rear part 3 to allow the head of the pet to get out.

Figure 2:
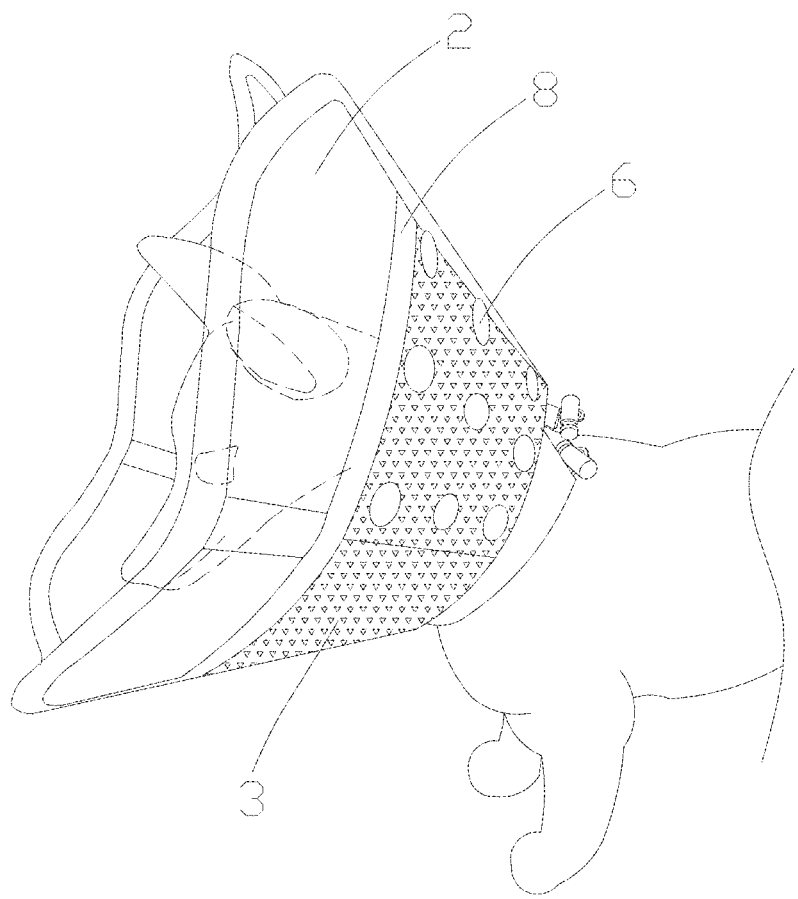
FIG. 2 is a schematic structural diagram of wearing a protective collar on a pet, wherein the dotted line part shows the head of a pet observed through a semi-transparent or transparent panel.
Figure 3:
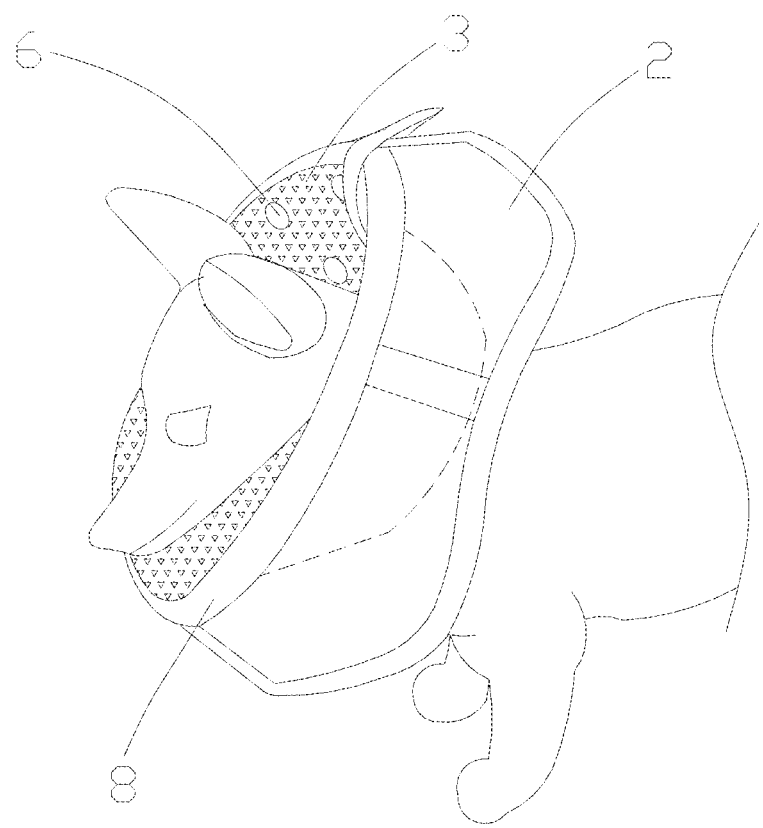
FIG. 3 is a schematic structural diagram of wearing a protective collar on a pet, wherein a front part is folded towards an outer side of the protective collar relative to a rear part; the dotted line part shows the rear part of a protective collar through a semi-transparent or transparent panel; and the rear part is simplified.

Referring to FIG. 2 and FIG. 3, during use of the protective collar, the first side end is attached to the second side end through the closing mechanism, so that the sheet material body can be enclosed to form the basically conical protective collar, so that the protective collar can be worn at the neck of the pet. Furthermore, the front part of the protective collar surrounds the head of the pet, so that the pet can be prevented from licking a wound or a diseased part. Meanwhile, since the front part is semi-transparent or transparent, the pet can observe a surrounding environment through the semi-transparent or transparent front part, so that the pet can have a wider field of view.

Further, in the protective collar, the front part can be folded towards the outer side of the protective collar relative to the rear part. If the pet needs to eat food or drink water, the front part can be folded towards the outer side, so that the head of the pet can get out of the protective collar, and the pet can eat food or drink water. After the pet finishes eating or drinking, only the front part needs to be reset to surround the head of the pet, so that the protective collar can be conveniently switched in different states, and the protective collar is very convenient to use.

Figure 4:
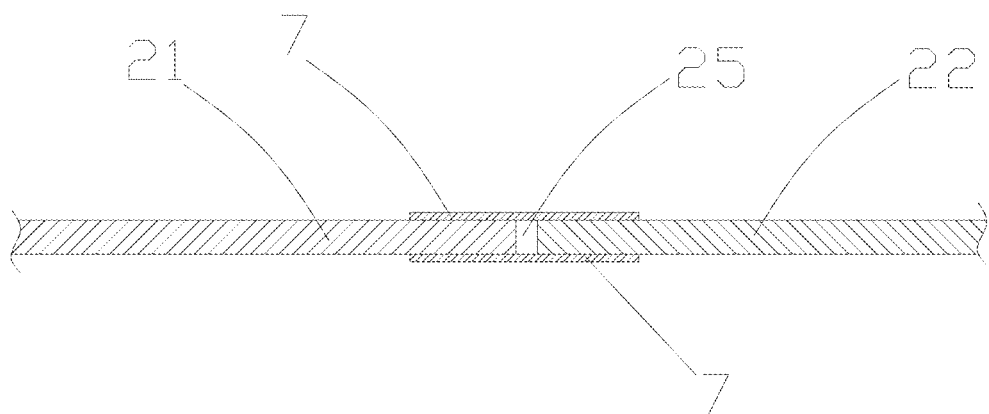
FIG. 4 is a schematic diagram of connection between a first transparent panel and a second transparent panel.

Referring to FIG. 4, the protective collar further includes a first flexible connector 7; the front part 2 at least includes a first transparent panel 21 and a second transparent panel 22 which are adjacent to each other; the first transparent panel 21 extends from a front side edge 23 of the front part to a rear side edge 24 of the front part; the second transparent panel 22 extends from the front side edge 23 of the front part to the rear side edge 24 of the front part; one side of the first flexible connector 7 is sewn to the first transparent panel 21; and the other side of the first flexible connector 7 is connected to the second transparent panel 22.

The first flexible connector 7 extends from the front side edge 23 of the front part to the rear side edge 24 of the front part. The first transparent panel and the second transparent panel can be folded at a position where the first flexible connector is located. The first transparent panel 21 and the second transparent panel 22 are both transparent plastic panels.

There may be five transparent panels, and the transparent panels are all transparent plastic panels. Adjacent transparent panels are connected through the first flexible connector. In this way, the adjacent transparent panels cam be folded with each other. Furthermore, to facilitate the folding between the adjacent transparent panels, a space 25 can be provided between the adjacent transparent panels.

The first flexible connector can be a woven tape. The woven tape has high flexibility and will not cause irreversible damage to the structure of the product even if it is folded for multiple times. The woven tape is stable and reliable in structure.

Further, each transparent panel is provided with an arc-shaped protrusion 26 at the front side edge of the front part. The arc-shaped protrusion is also transparent and is integrally formed with each transparent panel. When the sheet material body is enclosed into the protective collar, the protective collar can be shaped like a flower, with a decorative effect, making a pet feel like wearing flowers.

Moreover, the protective collar has a woven tape covered edge 11. The woven tape covered edge wraps around the first side end, the front side edge (arc-shaped protrusion) of the front part, and the second side end in sequence.

Of course, in the structure of the front part, the transparent panels can be replaced with semi-transparent panels. The semi-transparent panels can be panels with frosted surfaces. In summary, either a transparent panel or a semi-transparent panel can provide a field of view for a pet.

Figure 5:
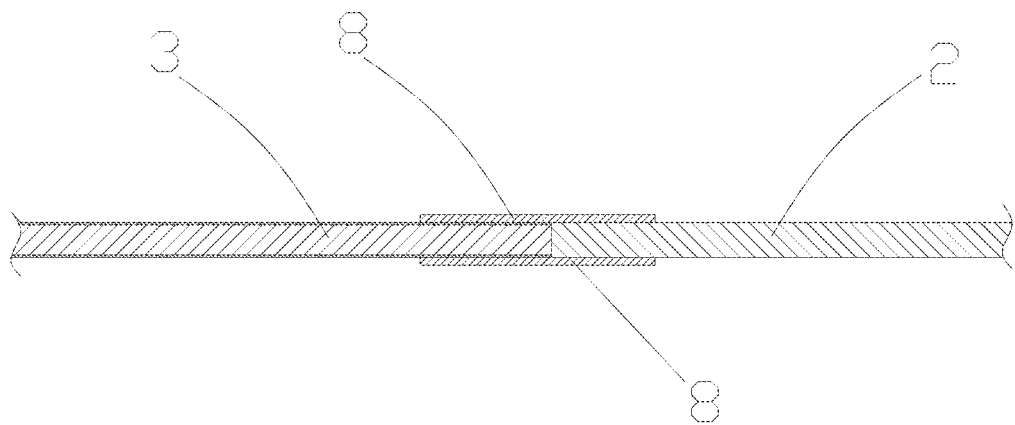
FIG. 5 is a schematic diagram of connection between a front part and a rear part.
Figure 6:
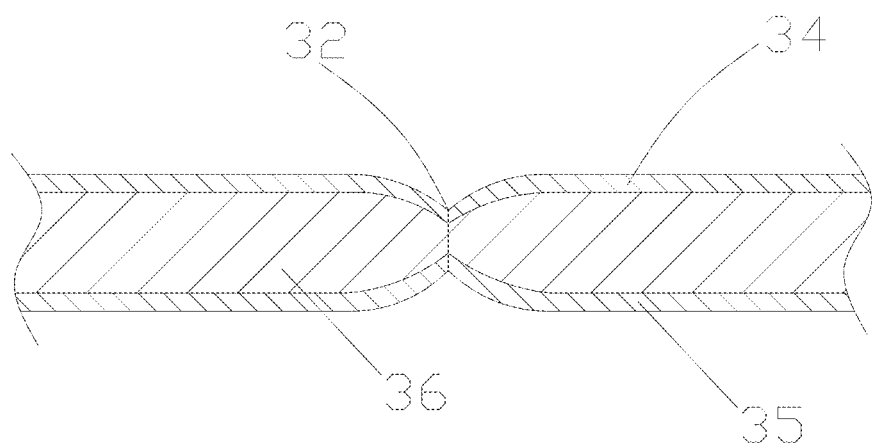
FIG. 6 is a schematic structural diagram of a rear part.

Referring to FIG. 5, the protective collar for the pet further includes a second flexible connector 8; one side of the second flexible connector 8 is sewn to the rear side edge 24 of the front part; and the other side of the second flexible connector 8 is sewn to a front side edge 31 of the rear part, so that the front part 2 can be folded towards the outer side of the protective collar relative to the rear part 3.

The second flexible connector 8 extends from the first side end 4 to the second side end 5. The front part and the rear part can be flipped and folded at a position where the second flexible connector is located.

The second flexible connector can be a woven tape. The woven tape has high flexibility and will not cause irreversible damage to the structure of the product even if it is flipped and folded for multiple times. The woven tape is stable and reliable in structure.

FIG. 5 only shows a schematic diagram of connection between the front part and the rear part, but it does not mean that a thickness of the front part is the same as a thickness of the rear part. In this patent, the thickness of the rear part can be greater than the thickness of the front part. Moreover, due to the flexibility of the second flexible connector, connection between the front part and the rear part can be achieved too.

The rear part 3 is flexible and air-permeable. Since the rear part of the protective collar is in direct contact with the neck of the pet, the flexible and air-permeable setting ensures that the pet can wear the protective collar for a long time and comfortably. The rear part 3 is non-transparent.

Specifically, the rear part 3 includes a first mesh layer 34 and a second mesh layer 35 which are stacked. A flexible layer 36 is arranged between the first mesh layer 34 and the second mesh layer 35, so that the rear part 3 is flexible and air-permeable. The first mesh layer and the second mesh layer are both air-permeable cloth with meshes, and the flexible layer is expanded polyethylene cotton with a thickness of 0.8 cm.

The rear part 3 is provided with a sewing thread; the sewing thread extends from the front side edge 31 of the rear part to the rear side edge 33 of the rear part; and the sewing thread is used to sew the first mesh layer 34, the flexible layer 36, and the second mesh layer 35 in sequence, so that the sewing thread is formed into a folding edge 32 of the rear part 3. In this way, the rear part of the protective collar can be folded along the folding edge.

The rear part can be divided into five parts by the folding edge, and the five parts correspond to the five transparent panels of the front part. Moreover, the folding edge is correspondingly arranged in a straight direction of the first flexible connector. In this way, the protective collar can be folded along the first flexible connector and the folding edge to facilitate the folding and storage of the protective collar. The protective collar has a simple structure and is convenient to use. During folding and storage, the protective collar can be alternatively folded along the second flexible connector, so that the protective collar can be further stored.

The rear side edge 33 of the rear part is provided with an adjustment channel 8 extending along the rear side edge 33 of the rear part; an adjustment rope 9 is arranged in the adjustment channel 8; two ends of the adjustment rope 9 are respectively threaded out of two ends of the adjustment channel 8; and rope locks 10 are respectively arranged at the two ends of the adjustment rope 9. During use, since the rear side edge of the rear part surrounds the neck of the pet, a length of the adjustment rope located in the channel can be adjusted through the rope locks at the two ends, achieving adjustable elasticity of the protective collar. This allows the protective collar to adapt to pets of different sizes, be better fitted to the neck of the pet, and be convenient to use. The adjustment channel can be formed by being surrounded by a double-sided threaded fabric. Furthermore, the fabric is soft and can be comfortably fitted to the neck of the pet.

The closing mechanism 6 includes a first closing member 61 and a second closing member 62; the first closing member 61 is arranged at the first side end 4; the second closing member 62 is arranged at the second side end 5; and the first closing member 61 is detachably connected to the second closing member 62. It is convenient to wear and unfasten the protective collar.

The first closing member 61 and the second closing member 62 are mutually coupled buttons. There are three rows of buttons at the first side end and three rows of buttons at the second side end. Different buttons at the first side end and the second side end are coupled and connected to achieve adjustment of an enclosure size of the protective collar to adapt to pets of different sizes. Of course, the first closing member and the second closing member can be mutually coupled structures such as zippers and hook and loop fasteners, as long as they can be detachably connected.

The above shows one or more implementations provided in combination with specific contents, and it is not deemed that the specific implementations of the present disclosure is limited to these explanations. Any technical inferences or replacements that are similar or identical to the method and structure of the present disclosure or made under the idea of the present disclosure shall fall within the protection scope of the present disclosure.

What is claimed is:

1. A protective collar for a pet, comprising:
   a basically fan-shaped sheet material body (1), wherein
      the sheet material body (1) comprises a front part (2), a rear part (3), a first side end (4), and a second side end (5); the front part (2) extends from the first side end (4) to the second side end (5), and the rear part (3) extends from the first side end (4) to the second side end (5); a radius of the front part (2) is greater than a radius of the rear part (3);

a closing mechanism (6), wherein the closing mechanism (6) attaches the first side end (4) to the second side end (5), so that the sheet material body (1) is enclosed to form a basically conical protective collar; the front part is semi-transparent or transparent; and when the protective collar is worn at the neck of a pet, the front part (2) surrounds the head of the pet for allowing the pet to observe a surrounding environment; and a first flexible connector (7);

wherein the front part (2) at least comprises a first transparent panel (21) and a second transparent panel (22) which are adjacent to each other; the first transparent panel (21) extends from a front side edge (23) of the front part to a rear side edge (24) of the front part; the second transparent panel (22) extends from the front side edge (23) of the front part to the rear side edge (24) of the front part; one side of the first flexible connector (7) is sewn to the first transparent panel (21); and the other side of the first flexible connector (7) is connected to the second transparent panel (22).

2. The protective collar for the pet according to claim 1, wherein the first flexible connector (7) extends from the front side edge (23) of the front part to the rear side edge (24) of the front part.

3. The protective collar for the pet according to claim 2, further comprising a second flexible connector (8), wherein one side of the second flexible connector (8) is sewn to the rear side edge (24) of the front part; and the other side of the second flexible connector (8) is sewn to a front side edge (31) of the rear part.

4. The protective collar for the pet according to claim 3, wherein the second flexible connector (8) extends from the first side end (4) to the second side end (5).

5. The protective collar for the pet according to claim 4, wherein the rear part (3) is provided with a folding edge (32); the folding edge (32) extends from the front side edge (31) of the rear part to a rear side edge (33) of the rear part; and the folding edge (32) is arranged in a straight direction of the first flexible connector (7).

6. The protective collar for the pet according to claim 1, wherein the closing mechanism (6) comprises a first closing member (61) and a second closing member (62); the first closing member (61) is arranged at the first side end (4); the second closing member (62) is arranged at the second side end (5); and the first closing member (61) is detachably connected to the second closing member (62).

7. A protective collar for a pet, comprising:

a basically fan-shaped sheet material body (1), wherein the sheet material body comprises a front part (2), a rear part (3), a first side end (4), and a second side end (5); the front part (2) extends from the first side end (4) to the second side end (5), and the rear part (3) extends from the first side end (4) to the second side end (5); a radius of the front part (2) is greater than a radius of the rear part (3); and a closing mechanism (6), wherein the closing mechanism (6) attaches the first side end (4) to the second side end (5), so that the sheet material body (1) is enclosed to form a basically conical protective collar; the front part (2) is semi-transparent or transparent; when the protective collar is worn at the neck of a pet through the rear part (3), the front part (2) surrounds the head of the pet for allowing the pet to observe a surrounding environment; and the front part (2) is able to be folded towards an outer side of the protective collar relative to the rear part (3) to allow the head of the pet to get out.

8. The protective collar for the pet according to claim 7, further comprising a first flexible connector (7), wherein the front part (2) at least comprises a first transparent panel (21) and a second transparent panel (22) which are adjacent to each other; the first transparent panel (21) extends from a front side edge (23) of the front part to a rear side edge (24) of the front part; the second transparent panel (22) extends from the front side edge (23) of the front part to the rear side edge (24) of the front part; one side of the first flexible connector (7) is sewn to the first transparent panel (21); and the other side of the first flexible connector (7) is connected to the second transparent panel (22).

9. The protective collar for the pet according to claim 8, wherein the first flexible connector (7) extends from the front side edge (23) of the front part to the rear side edge (24) of the front part.

10. The protective collar for the pet according to claim 8, wherein the first transparent panel (21) and the second transparent panel (22) are both transparent plastic panels.

11. The protective collar for the pet according to claim 10, wherein the second flexible connector (8) extends from the first side end (4) to the second side end (5).

12. The protective collar for the pet according to claim 7, further comprising a second flexible connector (8), wherein one side of the second flexible connector (8) is sewn to the rear side edge (24) of the front part; and the other side of the second flexible connector (8) is sewn to a front side edge (31) of the rear part, so that the front part (2) is able to be folded towards the outer side of the protective collar relative to the rear part (3).

13. The protective collar for the pet according to claim 7, wherein the rear part (3) is flexible and air-permeable.

14. The protective collar for the pet according to claim 13, wherein the rear part (3) comprises a first mesh layer (34) and a second mesh layer (35) which are stacked; and a flexible layer (36) is arranged between the first mesh layer (34) and the second mesh layer (35), so that the rear part (3) is flexible and air-permeable.

15. The protective collar for the pet according to claim 14, wherein the rear part (3) is provided with a sewing thread; the sewing thread extends from the front side edge (31) of the rear part to the rear side edge (33) of the rear part; and the sewing thread is used to sew the first mesh layer (34), the flexible layer (36), and the second mesh layer (35) in sequence, so that the sewing thread is formed into a folding edge (32) of the rear part (3).

16. The protective collar for the pet according to claim 7, wherein the rear part (3) is non-transparent.

17. The protective collar for the pet according to claim 7, wherein the rear side edge (33) of the rear part is provided with an adjustment channel (8) extending along the rear side edge (33) of the rear part; an adjustment rope (9) is arranged in the adjustment channel (8); two ends of the adjustment rope (9) are respectively threaded out of two ends of the adjustment channel (8); and rope locks (10) are respectively arranged at the two ends of the adjustment rope (9).

18. The protective collar for the pet according to claim 7, wherein the closing mechanism (6) comprises a first closing member (61) and a second closing member (62); the first closing member (61) is arranged at the first side end (4); the second closing member (62) is arranged at the second side end (5); and the first closing member (61) is detachably connected to the second closing member (62).

19. The protective collar for the pet according to claim 18, wherein the first closing member (61) and the second closing member (62) are mutually coupled buttons.

* * * * *